United States Patent
Petersson et al.

(10) Patent No.: US 12,509,576 B2
(45) Date of Patent: Dec. 30, 2025

(54) STABILIZED POLYMER COMPOSITIONS

(71) Applicant: HITACHI ENERGY LTD, Zürich (CH)

(72) Inventors: Linnea Petersson, Västerås (SE);
Henrik Hillborg, Västerås (SE);
Joakim Jämbeck, Stockholm (SE);
Gang Zhang, State College, PA (US);
T.C. Mike Chung, State College, PA (US)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 16/608,733

(22) PCT Filed: Apr. 27, 2018

(86) PCT No.: PCT/EP2018/060828
§ 371 (c)(1),
(2) Date: Oct. 25, 2019

(87) PCT Pub. No.: WO2018/202562
PCT Pub. Date: Nov. 8, 2018

(65) Prior Publication Data
US 2020/0224015 A1    Jul. 16, 2020

(30) Foreign Application Priority Data

May 3, 2017    (LU) ........................................ 100186

(51) Int. Cl.
*C08L 23/12*    (2006.01)
*C08L 23/14*    (2006.01)
*H01B 3/30*    (2006.01)
*H01G 4/18*    (2006.01)

(52) U.S. Cl.
CPC .............. *C08L 23/12* (2013.01); *C08L 23/14* (2013.01); *H01B 3/30* (2013.01); *H01G 4/18* (2013.01); *C08L 2201/08* (2013.01); *C08L 2203/20* (2013.01); *C08L 2205/025* (2013.01)

(58) Field of Classification Search
CPC ...... C08L 23/12; C08L 23/14; C08L 2201/08; C08L 2203/20; C08L 2205/025; H01B 3/30; H01B 3/441; H04G 4/18; H04G 4/32; C08K 6/16; C08K 5/005
See application file for complete search history.

(56) References Cited

U.S. PATENT DOCUMENTS

| | | | |
|---|---|---|---|
| 3,645,970 A | 2/1972 | Kleiner | |
| 3,819,410 A | 6/1974 | Kuckro et al. | |
| 5,556,901 A * | 9/1996 | Bryson | C04B 35/571 501/88 |
| 2009/0176093 A1* | 7/2009 | Appel | H01B 3/441 428/377 |
| 2013/0178726 A1 | 7/2013 | Wang et al. | |

FOREIGN PATENT DOCUMENTS

| | | |
|---|---|---|
| CA | 996563 A | 9/1976 |
| CA | 1168237 A | 5/1984 |
| CN | 1058014 A | 1/1992 |
| CN | 1774470 A | 5/2006 |
| CN | 104558821 A | 4/2015 |
| DE | 112013000539 T5 | 9/2014 |
| EP | 0466263 A2 | 1/1992 |
| EP | 1614712 A1 | 4/2006 |
| GB | 13214305 A | 8/1973 |
| JP | S475908 A | 3/1972 |
| JP | S4838463 B1 | 11/1973 |
| JP | S4937635 B1 | 10/1974 |
| JP | S4937636 B1 | 10/1974 |
| JP | S5825306 A | 2/1983 |
| JP | H10119127 A | 5/1998 |
| KR | 20050000392 A | 1/2005 |
| WO | 2009088412 A1 | 7/2009 |

OTHER PUBLICATIONS

Li et al., machine English translation of CN 10455882 (Year: 2015).*
Carl-Eric Wilen; et al: "Copolymerization of Ethylene and 6-tert-Butyl-2-(1,1-dimethylhept-6-enyl)-4-methylphenol over Three Different Metallocene-Alumoxane Catalyst Systems", Macromolecules 1996, 29, 27, 8569-8575, Dec. 30, 1996 (Abstract only) 10 pages.
Database WPI, Week 201561; Thomson Scientific, London, GB AN 2015-40352V, XP002777182, & CN 104 558 821 A (China Petroleum & Chem Corp) Apr. 29, 2015 2 pages.
International Search Report and Written Opinion of the International Searching Authority Application No. PCT/EP2018/060828 Completed: Jul. 24, 2018; Mailing Date: Aug. 7, 2018 9 pages.
Gang Zhang; et al: "Synthesis of Functional Polypropylene Containing Hindered Phenol Stabilizers and Applications in Metallized Polymer Film Capacitors", Macromolecules, vol. 48, No. 9, May 12, 2015, XP055378086 pp. 2925-2934.
First Search Report for Chinese Application No. 201880029158.8 dated Apr. 27, 2018, 2 pages.
Korean Office Action and Translation Application No. 10-2019-7034599 Completed: Jan. 12, 2020 9 pages.
Japanese Notice of Reasons for Rejection with English translation for Japanese Patent Application No. 2019-560094, Issued Mar. 24, 2020, 7 pages.
Japanese Office Action dated Mar. 29, 2022 for Japanese Patent Application No. 2020-192431, 8 pages (including English translation).

* cited by examiner

*Primary Examiner* — Jessica M Roswell
(74) *Attorney, Agent, or Firm* — Sage Patent Group

(57) ABSTRACT

A polymer composition including: a) a polymer matrix; b) a polymeric antioxidant compatible with the polymer matrix, and having pendant phenol antioxidant moieties; and c) a mono- or oligo-functional phenol antioxidant. The invention further discloses film capacitors and power system components having such polymer compositions.

14 Claims, 2 Drawing Sheets

STABILIZED POLYMER COMPOSITIONS

TECHNICAL FIELD

The present invention relates to stabilized polymer compositions. The invention further relates to film capacitors and power system components comprising such stabilized polymer compositions.

BACKGROUND

Polyolefins are the most commonly produced polymers globally, with polyethylene being the most commonly produced polymer and polypropylene being the second most commonly produced polymer. They are used in an extremely wide variety of applications, such as capacitors, electric cables, packaging, textiles, construction materials and automotive parts. However, these polymers are prone to degradation through oxidation due to exposure to heat and UV radiation. This is especially the case for polypropylene which has a tertiary-carbon bound hydrogen atom attached to the polymer backbone. Such hydrogen atoms have a relatively low C—H bond dissociation energy and are therefore especially prone to abstraction by oxygen-centered free radicals during oxidative processes.

In order to prevent oxidative degradation of polyolefins during processing and use, quantities of antioxidants are commonly added to the polyolefins during manufacture. These antioxidants are capable of reacting with peroxyl radicals formed during oxidative stress of the polyolefin in order to break the oxidative chain-reaction and thus protect the polyolefin from further degradation.

Besides polyolefins, a large range of other polymers are commonly stabilized using antioxidants. These include acrylics; polystyrene; styrenic copolymers such as ABS, MBS and SBS; polyacetals; polyamides, polycarbonates; polyesters; polyurethanes; PVC and polyvinyl butyral.

The antioxidants most commonly used in polymers are of the sterically-hindered phenol type. A common feature of such antioxidants is the presence of an ortho-substituted phenol moiety having a low O—H bond dissociation energy. Such phenols can sacrificially donate a phenolic hydrogen atom to a peroxyl radical, thereby forming a peroxide and a phenoxyl radical, and preventing the peroxyl radical from abstracting a hydrogen atom from the polymer backbone. The produced phenoxyl radical reacts further by combinations of disproportionation, reaction with a further peroxyl radical and/or dimerization in order to ultimately provide harmless non-radical products. In this manner the propagation of the oxidation radical chain reaction is broken.

The most widely used commercial antioxidants for polyolefins are relatively low molecular weight monofunctional or oligo-functional sterically hindered phenols, such as the monofunctional 2,6-Di-tert-butyl-phenol, 2,6-Di-tert-butyl-4-methylphenol (BHT), 2-tert-Butyl-4-methoxyphenol (BHA) and Octadecyl-3-(3,5-di-tert.butyl-4-hydroxyphenyl)-propionate (Irganox 1076); the difunctional 2-tert-Butyl-6-(2-hydroxy-3-tert-butyl-5-methyl-benzyl)-4-methyl-phenol (Cyanox 2246) and 2-tert-butyl-6-[(3-tert-butyl-5-ethyl-2-hydroxyphenyl)methyl]-4-ethylphenol (Cyanox 425); the trifunctional 1,3,5-Trimethyl-2,4,6-Tris (3,5-Di-tert-butyl-4-hydroxybenzyl)benzene (Ethanox 330) and 1,1,3-tris (2-methyl-4-hydrox-5-tert-butyl phenyl) butane (Topanol CA); and the tetrafunctional Pentaerythritol tetrakis(3-(3,5-di-tert-butyl-4-hydroxyphenyl)propionate) (Irganox 1010).

However, there are a number of drawbacks to using such small-molecular antioxidants that limit the stability, performance and properties of the stabilized polyolefin product. Phenol antioxidants are relatively polar and therefore are poorly soluble in the nonpolar polyolefin matrix. This can cause inhomogeneous distribution of the antioxidant in the polyolefin matrix leading to matrix antioxidant concentrations insufficient to inhibit oxidation of the polymer. Further consequences of this inhomogeneous distribution are antioxidant migration and leaching, and accelerated antioxidant loss when the polyolefin is exposed to heat, solvents and strong electric fields. Thus, the limited solubility of the antioxidant in the polymer matrix may limit the service life of polyolefin products, cause health and environmental issues due to leaching of the antioxidants, and limit the fields of application of the polymers. Moreover, antioxidants may increase the dielectric loss of polyolefin materials, and therefore reduction of antioxidant quantities in dielectrics may for this reason be desirable.

In order to ameliorate the deficiencies associated with typical small-molecular sterically hindered phenol antioxidants, the development of polymer-bound antioxidants has been explored. The aim of such research has been to produce polymeric antioxidants having improved compatibility with the polyolefin matrix and a reduced tendency to leach or migrate.

Zhang et. al. (Zhang, G., Li, H., Antensteiner, M., & Chung, T. M. (2015). Synthesis of functional polypropylene containing hindered phenol stabilizers and applications in metallized polymer film capacitors. Macromolecules, 48(9), 2925-2934) discloses the synthesis of a family of polymeric stabilizers containing a polypropylene backbone and several pendant hindered phenol groups (PP-HP). Some PP-HP copolymers showed higher thermo-oxidative stability than pristine polypropylene (PP) and commercially stabilized PP products. Improved oxidative stability was also observed in PP/PP-HP blends. The effectiveness of the PP-HP polymeric stabilizer was attributed to its compatibility and co-crystallization with the PP homopolymer, resulting in a uniform distribution of hindered phenol moieties.

There remains a need for improved stabilized polymer compositions.

SUMMARY

The inventors of the present invention have identified a number of deficiencies with prior art stabilized polymer compositions. Commercial mono-functional and oligo-functional sterically hindered phenol antioxidants are cheap and widely available. However, such antioxidants are relatively insoluble in the polymer matrix, especially when the polymer is semi-crystalline, leading to problems with insufficient antioxidant concentration, migration and leaching. Polymer-bound antioxidants have been developed to overcome such problems, but the polymer-bound antioxidants are themselves more cumbersome than traditional antioxidants to manufacture, not currently widely available, and therefore expensive, especially in the quantities required to provide sufficient protection for the polymer matrix.

It is an object of the present invention to provide a polymer composition that has excellent resistance to oxidative degradation, that has a low propensity to leach or exude antioxidant, and that is cost-effective. Such polymer compositions may also be known as stabilized polymer compositions, whereby it is meant polymer compositions having a greater resistance to oxidative degradation than corresponding polymer compositions not comprising antioxidants.

The object of the invention is obtained by a polymer composition according to the appended claims. The polymer composition comprises:

a) a polymer matrix;
b) a polymeric antioxidant compatible with the polymer matrix, and comprising pendant phenol antioxidant moieties; and
c) a mono- or oligo-functional phenol antioxidant.

The polymeric antioxidant in such a composition acts as a compatibilizer between the polymer matrix and the mono- or oligo-functional phenol antioxidant. Thus, the addition of relatively small quantities of the polymeric antioxidant to the composition allows for a much improved dispersion of the traditional mono- or oligo-functional phenol antioxidant in the polymer matrix. This means that the antioxidants remain in the polymer composition and are less prone to migration and/or leaching. The higher concentration of well-dispersed antioxidant in the matrix means that the polymer composition has a much improved resistance to oxidation. Other properties of the polymer composition, such as the dielectric properties may be tailored due to the possibility of using the polymeric antioxidant to increase the dielectric constant, and/or using lesser quantities of mono- or oligo-functional phenol antioxidant, due to lessened leaching and migration.

The polymer matrix may comprise one or more of a polyolefin, a natural rubber, an acrylic, polystyrene, a styrenic copolymer, a polyacetal, a polyamide, a polycarbonate, a polyester, a polyurethane, PVC, and polyvinyl butyral. All of these polymers are commonly stabilized using phenolic antioxidants. The polymer matrix may be a polyolefin selected from polyethylene (PE), polypropylene (PP), polymethylpentene (PMP), polybutene-1 (PB-1), polyisobutylene (PIB), ethylene propylene rubber (EPR) and ethylene propylene diene rubber (EPDM). Such polyolefins include, but are not limited to, LDPE, LLDPE, VLDPE, HDPE, XLPE, MDPE, UHMWPE and BOPP. Polypropylenes have low polarity and/or are semi-crystalline, meaning that traditional mono- or oligo-functional phenol antioxidants have particularly low compatibility with such polymer matrices. The present invention solves this problem.

The polymeric antioxidant may comprise the same monomer units as the polymer matrix. By this it is meant that the polymeric antioxidant may be a copolymer comprising all of the monomer units present in the polymer matrix as well as monomer units comprising pendant phenol antioxidant moieties. The polymer matrix and the polymeric antioxidant may be capable of co-crystallizing with each other.

The polymer composition may comprise a polyolefin as the polymer matrix and a polyolefin copolymer as the polymeric antioxidant.

The pendant phenol antioxidant moieties may comprise phenol groups comprising one or two ortho-substituents selected from C1-C4 alkyl, C1-C4-alkoxy, amino, N-alkylamino and N, N'-dialkylamino. The ortho substituents lower the OH bond dissociation energy of the phenol and increase its antioxidant effect.

The polymeric antioxidant may comprise from 0.2 to 10 mol % pendant phenol antioxidant moieties. This is sufficient to allow the polymeric antioxidant to act as a compatibilizer between the polymer matrix and the antioxidant phase.

The mono- or oligo-functional phenol antioxidant may be selected from 2,6-di-tert-butyl-phenol, 2,6-Di-tert-butyl-4-methylphenol, 2-tert-butyl-4-methoxyphenol and octadecyl-3-(3,5-di-tert.butyl-4-hydroxyphenyl)-propionate, 2-tert-butyl-6-(2-hydroxy-3-tert-butyl-5-methyl-benzyl)-4-methyl-phenol and 2-tert-butyl-6-[(3-tert-butyl-5-ethyl-2-hydroxyphenyl)methyl]-4-ethylphenol, the trifunctional 1,3, 5-trimethyl-2,4,6-tris (3,5-Di-tert-butyl-4-hydroxybenzyl) benzene, 1,1,3-tris (2-methyl-4-hydrox-5-tert-butyl phenyl) butane, pentaerythritol tetrakis(3-(3,5-di-tert-butyl-4-hydroxyphenyl)propionate), and combinations thereof. Such antioxidants are mass-produced, readily available, cheap and well-proven in polymer applications.

The pendant phenol antioxidant moiety and the mono- or oligo-functional phenol antioxidant may have a matching hindered phenol structural element. By this, it is meant that a part of the pendant phenol antioxidant moiety and a part of the mono- or oligo-functional phenol antioxidant may have a matching chemical structure. For example, both the pendant phenol antioxidant moiety and the mono- or oligo-functional phenol antioxidant may comprise a 3,5-di-tert-butyl-4-hydroxyphenylpropionate structural element. This may further improve the overall compatibility of the polymer composition.

The polymer composition may comprise from 0.1 weight % to 90 weight % of polymeric antioxidant, calculated with respect to the total weight of the polymer composition. Because the polymeric antioxidant is compatible with the polymer matrix it may be used in a wide range of concentrations tailored to provide the oxidative protection required for any given application.

The polymer composition may comprise from 0.1 weight % to 5 weight % of mono- or oligo-functional phenol antioxidant, calculated with respect to the total weight of the polymer composition. This allows a sufficient antioxidant loading to provide excellent protection against oxidative degradation.

The polymer composition comprises from 5 weight % to 99.8 weight % of the polymer matrix, calculated with respect to the total weight of the polymer composition. Excellent resistance to oxidative degradation may be obtained even when the polymer composition is predominantly composed of polymer matrix.

The polymer composition may further comprise one or more further polymer additives, such as stabilizers, modifiers or fillers.

According to one embodiment the polymer matrix may be polypropylene and the polymeric antioxidant may be a polypropylene copolymer.

According to another aspect of the present invention, the object of the invention is achieved by a film capacitor according to the appended claims. The film capacitor comprises a dielectric comprising a polymer composition as described herein. Such film capacitors may be operated at higher temperatures due to their excellent resistance to oxidative degradation combined with good dielectric properties.

According to a further aspect of the present invention, the object of the invention is achieved by an electric power system component according to the appended claims. The electric power system component comprises an insulator comprising a polymer composition as described herein. The electric power system component may be an electrical cable, a cable joint, a bushing or a cable termination. The excellent resistance to oxidative degradation means that the electric power system component may be operated at higher temperatures and/or voltages.

Further objects, advantages and novel features of the present invention will become apparent to one skilled in the art from the following detailed description.

BRIEF DESCRIPTION OF THE DRAWINGS

For a fuller understanding of the present invention and further objects and advantages of it, the detailed description set out below should be read together with the accompanying drawings, in which the same reference notations denote similar items in the various diagrams, and in which.

DETAILED DESCRIPTION

Figure 1:
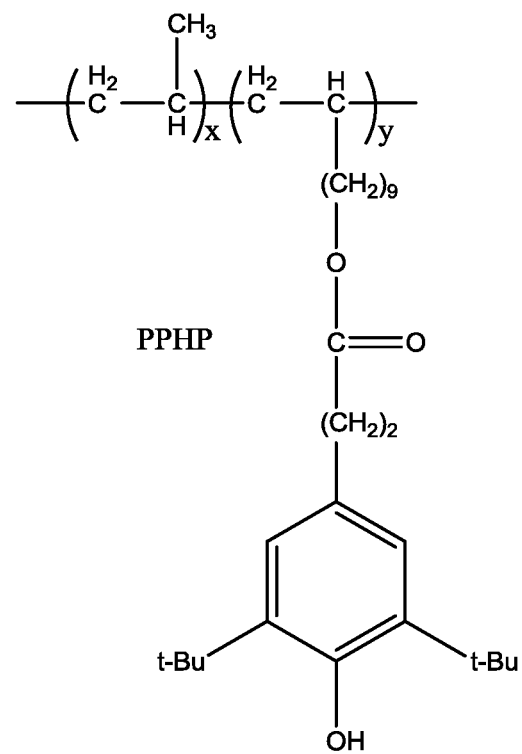
FIG. 1 schematically illustrates a polypropylene copolymer comprising pendant 3,5-di-t-butyl-4-hydroxyphenyl propionate moieties.

The present invention is based on a discovery by the inventors that polymeric antioxidants not only have better compatibility with a polymer matrix as compared to traditional mono- or oligo-functional phenol antioxidant, but they are also capable of improving the compatibility of such traditional mono- or oligo-functional phenolic antioxidants in the polymer matrix. Therefore, in a ternary blend comprising a polymer matrix, polymeric antioxidant and mono- or oligo-functional phenol antioxidant, the polymeric antioxidant acts as a compatibilizer, increasing the compatibility between the polymer matrix and the mono- or oligo-functional antioxidant.

Because the traditional antioxidant may be more evenly dispersed in the polymer matrix when using a polymeric antioxidant as a compatibilizer, the effective concentration of the traditional antioxidant in the matrix is higher, even when the quantity of traditional antioxidant used is not increased as compared to conventional binary polymer/antioxidant blends. This is because in conventional binary polymer/antioxidant blends the antioxidant forms clusters within the matrix or migrates to the surface of the matrix due to low compatibility, and therefore is effectively "lost". This is especially the case for semi-crystalline and/or non-polar polymers such as polyolefins, polyacetals, polyamides, and polyesters; and particularly for semi-crystalline polyolefins, more specifically polypropylene and polyethylene.

By using a polymeric antioxidant to improve the compatibility between the traditional antioxidant and the polymer matrix a number of beneficial effects may be obtained due to the high and even effective matrix concentration of the traditional antioxidant. The oxidative stability of the polymer composition is improved dramatically, which cannot be accounted for solely by the small amount of additional antioxidant moieties present in the composition from incorporation of the polymeric antioxidant. Moreover, due to better matrix/antioxidant compatibility problems with migration and leaching of the antioxidant may be ameliorated. When using the polymeric composition in electrical applications, the tendency of the antioxidant to migrate in electric fields may be weakened. Finally, the high and evenly dispersed concentration of the antioxidant in the polymer composition may provide improved dielectric properties. This is because in conventional binary polymer/antioxidant compositions the phase separation and cluster formation of the antioxidant means that it does not contribute much to increasing the dielectric constant (ε) of the composition. At the same time, the interfaces between the antioxidant and matrix domains increase the dielectric loss of the composition (tan δ). By increasing matrix antioxidant concentration and reducing the incidence of domain interphases, the dielectric constant may be increased, whilst maintaining low dielectric loss.

The polymer compositions according to the present invention comprise:

a.) a polymer matrix;
b.) a polymeric antioxidant compatible with the polymer matrix, and comprising pendant phenol antioxidant moieties; and
c.) a mono- or oligo-functional phenol antioxidant Polymer Matrix The polymer matrix may be any polymer that commonly requires stabilization by an antioxidant, such as polyolefins, acrylics, polystyrene, styrenic copolymers such as ABS, MBS and SBS, polyacetals, polyamides, polycarbonates, polyesters, polyurethanes, PVC and polyvinyl butyral. However, the invention is most beneficial to polymers having poor compatibility with traditional antioxidants, such as semi-crystalline and/or non-polar polymers. Such polymers include polyamides such as polyamide 66 and polyamide 11; polyesters such as polyethylene terephthalate (PET); polyacetals such as polyoxymethylene (POM); and polyolefins such as polypropylene (PP) and polyethylene. The polymer matrix is preferably a polyolefin selected from polyethylene (PE), polypropylene (PP), polymethylpentene (PMP), polybutene-1 (PB-1), polyisobutylene (PIB), ethylene propylene rubber (EPR) and ethylene propylene diene rubber (EPDM). This includes such polyolefins as LDPE, LLDPE, VLDPE, HDPE, XLPE, MDPE, UHMWPE and BOPP.

The polymer matrix may be a miscible polymer blend. The polymer matrix may be a homopolymer—homopolymer blend, such as for example a PET/PBT blend, or it may be a homopolymer—copolymer blend, such as for example a PP/EPDM blend.

Polymeric Antioxidant

The polymeric antioxidant is compatible with the polymer matrix, and comprises pendant phenol antioxidant moieties. By compatible with the polymeric matrix it is meant that the polymer antioxidant forms a homogenous blend with the polymer matrix, or forms a dispersed blend exhibiting macroscopically uniform physical properties. If the polymer matrix and polymer antioxidant are semi-crystalline, the polymer antioxidant may co-crystallize with the polymer matrix.

The polymeric antioxidant may have a backbone that is the same or similar to the backbone of the polymer in the polymer matrix. Polymer backbones are considered to be the same if they derive from the same monomers, even if in the case of co-monomers the exact distribution of the monomers in the polymer chain may differ. Polymer backbones are considered similar if they comprise the same functional groups but differ in a spacer separating the functional groups. For example PET and PBT are considered to have similar backbones.

The polymeric antioxidant may be predominantly composed of the same or similar monomers to the polymeric matrix. For example, if the polymer matrix is polypropylene then the polymeric antioxidant may be a polypropylene copolymer predominantly composed of propylene monomers. The polymeric antioxidant may be primarily based on monomer units selected from the olefins ethylene, propylene, 1-butene, isobutylene, methylpentene, dicyclopentadiene, ethylidene norbornene and vinyl norbornene. Preferably, the polymeric antioxidant is a polypropylene copolymer.

The polymeric antioxidant may comprise from 0.2 to 10 mol % pendant phenol antioxidant moieties, such as from 0.5 to 5 mol % pendant phenol antioxidant moieties. The mol % of pendant phenol antioxidant moieties in the polymeric antioxidant is defined as the mol % of monomer units in the copolymer having pendant phenol antioxidant moieties, relative to the total monomer units in the polymeric antioxidant. This may for example be determined by quantitative 1H NMR spectroscopy of the polymeric antioxidant.

The quantity of pendant phenol antioxidant moieties in the polymeric antioxidant may be expressed either in mol % or in weight %, and these units may be easily interconverted. Taking as an example a polypropylene (PP) copolymer having pendant phenol antioxidant moieties deriving from 3,5-di-t-butyl-4-hydroxyphenylpropionic acid (HP), the PP portion has a unit weight of approximately 42 g/mol (not taking into account the linker groups L extending from the backbone of the polypropylene). The 3,5-di-t-butyl-4-hydroxyphenylpropionic acid has a molecular weight of approximately 278 g/mol. A polypropylene copolymer comprising 1 mol % of pendant phenol antioxidant moieties has therefore approximately 6.3 wt % 3,5-di-t-butyl-4-hydroxyphenylpropionate groups.

The pendant phenol antioxidant moieties may comprise a sterically hindered phenol moiety, such as a 2,6-disubstituted phenol moiety. Such 2,6-disubstituted phenol moieties may be 3,5-di-t-butyl-4-hydroxytoluene moieties or 3,5-di-t-butyl-4-hydroxyphenyl propionate moieties.

The pendant phenol antioxidant moieties may be connected to the backbone of the polymeric antioxidant by a linker. This linker may for example be an n-alkyl chain comprising from 2 to 15 carbon atoms.

Manufacture of Polymeric Antioxidant

The polymeric antioxidant having pendant phenol antioxidant moieties may be manufactured by any means known in the art. For example, the polymeric antioxidant may be manufactured by post-functionalization of a suitable copolymer with a phenol antioxidant.

For example, a polyolefin copolymer having hydroxy functionalities may be manufactured by copolymerization of an olefin with a hydroxy-functionalized olefin, or a masked or protected derivative thereof. The hydroxy-functionalized olefin may for example be a straight-chain alpha $C_3$-$C_{20}$ olefin having a single hydroxy group on the carbon atom most remote from the double bond. Suitable hydroxy-functionalized olefins include, but are not limited to, 10-undecen-1-ol, 9-decen-1-ol, 8-nonen-1-ol, 7-octen-1-ol, 6-hepten-1-ol, 5-hexen-1-ol, 4-penten-1-ol, 3-buten-1-ol and allyl alcohol. The dielectric losses associated with the polymeric antioxidant constituent of the composition may be reduced by using a straight-chain alpha $C_3$-$C_{10}$ olefin having a single hydroxy group on the carbon atom most remote from the double bond. The polyolefin copolymer having hydroxy functionalities may then be coupled with an antioxidant having a carboxylic acid functionality, or equivalent thereof. This coupling may for example be performed using the coupling reagents EDC (1-Ethyl-3-(3-dimethylaminopropyl)carbodiimide) and DMAP (N,N'-dimethylaminopyridine), as disclosed in Zhang, G., Li, H., Antensteiner, M., & Chung, T. M. (2015); "Synthesis of functional polypropylene containing hindered phenol stabilizers and applications in metallized polymer film capacitors", Macromolecules, 48(9), 2925-2934. However, other means of coupling and coupling reagents are known in the art.

Alternatively, the polymeric antioxidant may be prepared by copolymerization using a monomer incorporating a phenolic antioxidant moiety, such as described in Wilén, C. E., Luttikhedde, H., Hjertberg, T., & Näsman, J. H. (1996): "Copolymerization of Ethylene and 6-tert-Butyl-2-(1, 1-dimethylhept-6-enyl)-4-methylphenol over Three Different Metallocene-Alumoxane Catalyst Systems", Macromolecules, 29(27), 8569-8575.

However, other means of preparing the polymeric antioxidant are conceivable. For instance, post-functionalization of suitable copolymers may be performed using any suitable coupling chemistry, such as peptide coupling, transition-metal mediated coupling reactions, and cycloaddition reactions such as the Huisgen copper-catalyzed "click" [3+2] cycloaddition.

Mono-or Oligo-Functional Phenol Antioxidant

The mono-or oligo-functional phenol antioxidant used may be any such phenol antioxidant known in the art. By mono- or oligo-functional it is meant that the antioxidant comprises one or more phenol moieties having antioxidant activity. Such phenol moieties are commonly phenols having one or more ortho substituent groups such as methyl or t-butyl. Oligo-functional phenol antioxidants may have up to six phenol moieties, such as up to five phenol moieties, or up to four phenol moieties. The mono-or oligo-functional phenol antioxidants typically have a molecular weight of less than 2 kDa, such as less than 1.2 kDa. Where an antioxidant is referred to herein as a traditional antioxidant, it is meant a mono-or oligo-functional phenol antioxidant.

Among the most widely used commercial mono-or oligo-functional phenol antioxidants for polyolefins are the monofunctional 2,6-di-tert-butyl-phenol, 2,6-Di-tert-butyl-4-methylphenol (BHT), 2-tert-butyl-4-methoxyphenol (BHA) and octadecyl-3-(3,5-di-tert.butyl-4-hydroxyphenyl)-propionate (Irganox 1076); the difunctional 2-tert-butyl-6-(2-hydroxy-3-tert-butyl-5-methyl-benzyl)-4-methyl-phenol (Cyanox 2246) and 2-tert-butyl-6-[(3-tert-butyl-5-ethyl-2-hydroxyphenyl)methyl]-4-ethylphenol (Cyanox 425); the trifunctional 1,3,5-trimethyl-2,4,6-tris (3,5-Di-tert-butyl-4-hydroxybenzyl)benzene (Ethanox 330) and 1,1,3-tris (2-methyl-4-hydrox-5-tert-butyl phenyl) butane (Topanol CA); and the tetrafunctional pentaerythritol tetrakis(3-(3,5-di-tert-butyl-4-hydroxyphenyl)propionate) (Irganox 1010).

The pendant phenol antioxidant moiety and the mono-or oligo-functional phenol antioxidant may each have a different sterically hindered phenol structure, or may each have the same sterically hindered phenol structure, i.e. they may both have a matching sterically hindered phenol structure. For example, if the polymeric antioxidant comprises 3,5-di-t-butyl-4-hydroxyphenyl propionate moieties then the mono-or oligo-functional phenol antioxidant may for example be Irganox 1076 or Irganox 1010, which both also possess a 3,5-di-t-butyl-4-hydroxyphenyl propionate structure.

Polymer Composition

The composition of the polymer composition may be varied. The polymer composition may comprise from 0.1 weight % to 90 weight % of polymeric antioxidant, such as from 1 weight % to 70 weight %, from 2 weight % to 50 weight %, or from 5 weight % to 30 weight %, calculated with respect to the total weight of the polymer composition. The polymer composition may comprise from 0.1 weight % to 5 weight % of mono- or oligo-functional phenol antioxidant, such as from 0.2 weight % to 2 weight %, calculated with respect to the total weight of the polymer composition. The polymer composition may comprise from 5 weight % to 99.8 weight % of polymer matrix, such as from 10 weight % to 99 weight %, from 30 weight % to 98 weight %, or from 50 weight % to 90 weight %, calculated with respect to the total weight of the polymer composition.

The polyolefin composition may comprise further additives known in the art, including but not limited to scorch retardants, pigments, dyes, fillers, UV-absorbers, nucleating agents and flame retardants.

Applications

The dielectric properties, mechanical properties and resistance to oxidative degradation make the polymer compositions well suited for use in electrical applications. A film comprising the polymer composition may be used as a dielectric in film capacitors. Such a film may be biaxially oriented, and/or may be metallized. For example, the dielectric film may be a biaxially-oriented polypropylene (BOPP) film. The polymer composition may be used in other electrical applications requiring an insulating material or dielectric having lower levels of dielectric loss. Such applications include insulation materials for power cables, cable joints, bushings and cable terminations.

Examples

A polymeric antioxidant comprising a polypropylene copolymer having 1 mol % pendant 3,5-bis(tert-butyl)-4-hydroxyphenylpropionate groups was synthesized as described in Zhang, G., Li, H., Antensteiner, M., & Chung, T. M. (2015): Synthesis of functional polypropylene containing hindered phenol stabilizers and applications in metallized polymer film capacitors. Macromolecules, 48(9), 2925-2934. This polymeric antioxidant is denoted PPHP (i.e. a PolyPropylene-Hindered Phenol copolymer), and its structure is illustrated in FIG. 1.

Ternary blends of polypropylene (PP) polymer matrix, polymeric antioxidant (PPHP) and mono- or oligo-functional phenol antioxidant (AO) were prepared by mixing the PPHP described above with a polypropylene composition based upon a commercial PP. The commercial PP is a polypropylene homopolymer (capacitor grade) comprising 0.5 wt % of a mono- or oligo-functional phenol antioxidant. This 0.5 wt % mono- or oligo-functional phenol antioxidant composition is hereafter denoted PP (0.5 wt %). Ratios of from 1:1 PP (0.5 wt %):PPHP to 200:1 PP (0.5 wt %):PPHP w/w were prepared and tested. As reference materials, the pure commercial PP composition (comprising 0.5 wt % of a mono- or oligo-functional phenol antioxidant) was tested, as was a further commercially available polypropylene composition (denoted PP-Normal which is not a capacitor grade PP).

In the tests performed, the various samples are denoted as follows:

| Polymer Composition | Line nr. |
| --- | --- |
| PP-Normal | 1 |
| PP (0.5 wt %) | 3 |
| PP (0.5 wt %):PPHP 1:1 | 5 |
| PP (0.5 wt %):PPHP 5:1 | 7 |
| PP (0.5 wt %):PPHP 10:1 | 9 |
| PP (0.5 wt %):PPHP 20:1 | 11 |
| PP (0.5 wt %):PPHP 50:1 | 13 |
| PP (0.5 wt %):PPHP 100:1 | 15 |
| PP (0.5 wt %):PPHP 200:1 | 17 |

Thermogravimetric Analysis

Figure 2:
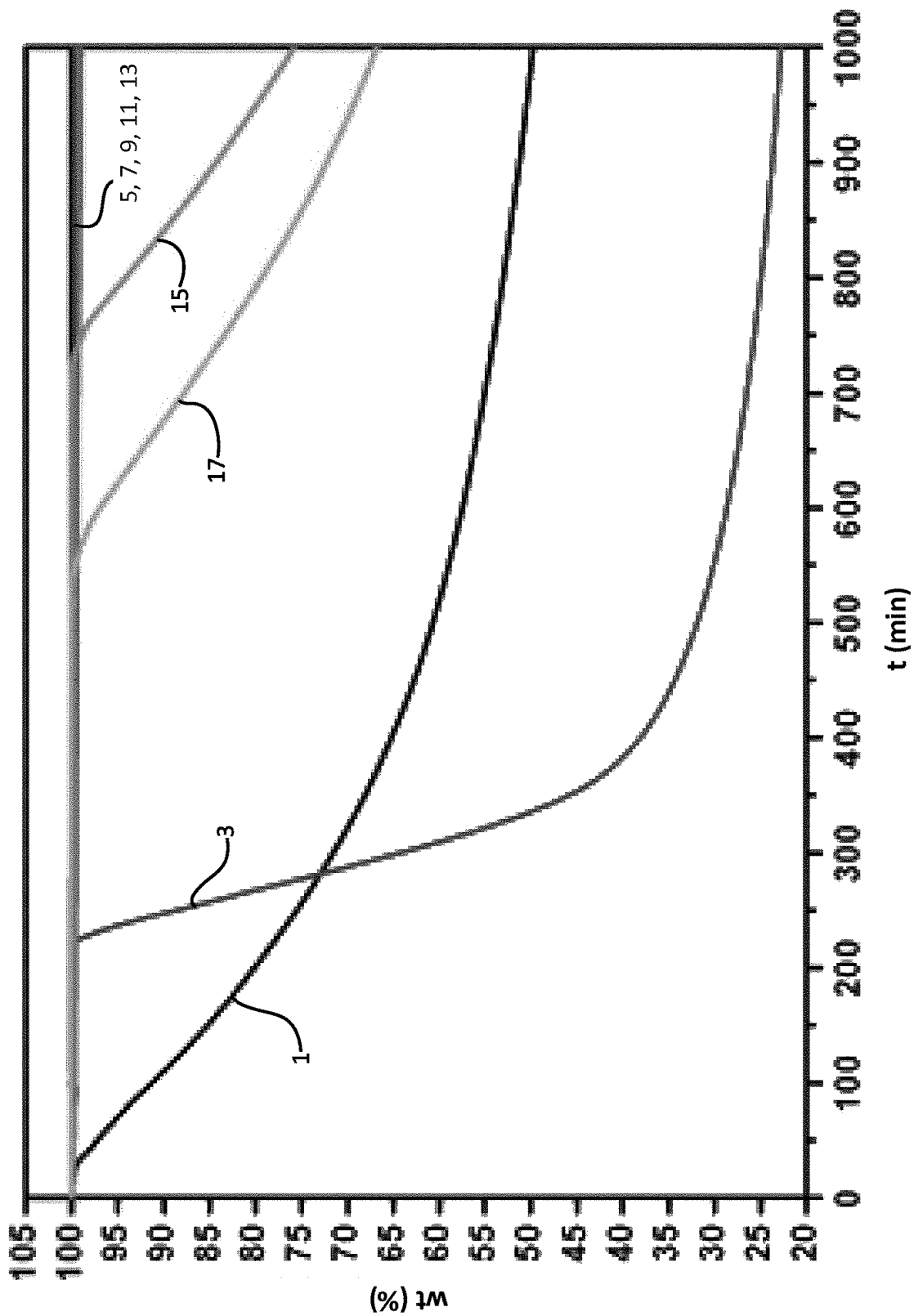
FIG. 2 illustrates the thermogravimetric analysis of compositions comprising polypropylene, the polymeric antioxidant PP-HP and the mono- or oligo-functional phenol antioxidant.

The oxidative stability of the prepared compositions was tested by performing thermogravimetric analysis of a sample of each composition at a constant temperature of 190° C. in air. The weight % of each sample relative to the initial weight as a function of heating time in minutes is shown in FIG. 2, and the samples are denoted as shown above.

It can be seen that both commercially available stabilized polypropylene compositions, PP-Normal (line 1) and PP (0.5 wt %) (line 3) show limited endurance time at 190° C., with PP-Normal demonstrating significant weight loss after less than 50 minutes and PP (0.5 wt %) demonstrating weight loss after less than 250 minutes. However, all ternary PP/PPHP/AO blends show significantly higher stability. Ternary blends having weight ratios of PP (0.5 wt %):PPHP of 50:1 or higher show almost no detectable weight loss after 1000 minutes at 190° C. Even with a PP (0.5 wt %):PPHP ratio of as high as 200:1 (approximately 0.5 wt % PPHP) the heating time before appreciable weight loss was in excess of 550 minutes, which is more than double as long as the comparable heating time for the PP (0.5 wt %), which is stabilized only with a mono- or oligo-functional phenol antioxidant.

The small addition of phenol antioxidant moieties to the polymer composition from PPHP cannot account for the dramatic increase of the thermal/oxidative stability. Without wishing to be bound by theory, it seems that the PPHP copolymer serves as an interfacial agent between the polypropylene matrix and the mono- or oligo-functional phenol antioxidant in order to form a uniform morphology with the molecular dispersion of the mono- or oligo-functional phenol antioxidant in the polypropylene matrix. It appears that concentrations of about 2 weight % or greater of PPHP in the polymer composition are sufficient to provide completely uniform morphology at the mono- or oligo-functional phenol antioxidant concentration tested.

Oxidative Induction Time (OIT)

The OIT of a number of samples was determined using the ASTM D3895-14 standard method. This involves determining the heat flow using differential scanning calorimetry when heating the samples at 190° C. in oxygen and measuring the response as a function of time.

The results are shown in in the Table below.

| Polymer Composition | OIT (min) |
| --- | --- |
| PP-Normal | 16 |
| PP (0.5 wt %) | 63 |
| PP (0.5 wt %):PPHP 10:1 | 230 |
| PP (0.5 wt %):PPHP 20:1 | 180 |
| PP (0.5 wt %):PPHP 50:1 | 115 |
| PP (0.5 wt %):PPHP 100:1 | 91 |
| PP (0.5 wt %):PPHP 200:1 | 82 |

It can be seen that addition of even small amounts of polymeric antioxidant (approx. 0.5 wt %) provides a significant improvement in OIT, and the more polymeric antioxidant that is added, the larger the improvement of OIT obtained.

The invention claimed is:
1. A polymer composition comprising:
a) a polymer matrix, the polymer composition including from 5 weight % to 99.8 weight % of the polymer matrix, calculated with respect to the total weight of the polymer composition, the polymer matrix comprising a polyolefin selected from polyethylene (PE), polypropylene (PP), polymethylpentene (PMP), polybutene-1 (PB-1) polyisobutylene (PIB), ethylene propylene rubber (EPR) and ethylene propylene diene rubber (EPDM) including low density polyethylene (LDPE), linear low density polyethylene (LLDPE), very low density polyethylene (VLDPE), high density polyethylene (HDPE), cross linked polyethylene (XLPE), medium density polyethylene (MDPE), ultra high molecular weight polyethylene (UHMWPE) and biaxially-oriented polypropylene (BOPP);
b) a polymeric antioxidant compatible with the polymer matrix, and including from 0.2 to 10 mol % pendant phenol antioxidant moieties, the polymer composition including from 0.1 weight % to 50 weight % of polymeric antioxidant, calculated with respect to the total weight of the polymer composition, a weight % of the polymeric antioxidant being 0.5% of a weight of the polymer matrix; and c) a mono-or oligo-functional phenol antioxidant, the polymer composition including from 0.1 weight % to 5 weight % of mono-or oligo-functional phenol antioxidant, calculated with respect to the total weight of the polymer composition, and the polymeric antioxidant is a compatibilizer between the polymer matrix and the mono-or oligo-functional phenol antioxidant.

2. The polymer composition according to claim 1, wherein the polymer matrix includes one or more of a natural rubber, an acrylic, polystyrene, a styrenic copolymer, a polyacetal, a polyamide, a polycarbonate, a polyester, a polyurethane, PVC, and polyvinyl butyral.

3. The polymer composition according to claim 1, wherein the polymeric antioxidant includes the same monomer units as the polymer matrix.

4. The polymer composition according to claim 1, wherein the polymer matrix and the polymeric antioxidant can crystalize.

5. The polymer composition according to claim 1, wherein the polymer matrix is a polyolefin and the polymeric antioxidant is a polyolefin copolymer.

6. The polymer composition according to claim 1, wherein the pendant phenol antioxidant moieties include phenol groups including one or two ortho-substituents selected from C1-C4 alkyl, C1-C4-alkoxy, amino, N-alkylamino and N,N'-dialkylamino.

7. The polymer composition according to claim 1, wherein the mono-or oligo-functional phenol antioxidant is selected from 2,6-di-tert-butyl-phenol, 2,6-Di-tert-butyl-4-methylphenol, 2-tert-butyl-4-methoxyphenol and octadecyl-3-(3,5-di-tert-butyl-4-hydroxyphenyl)-propionate, 2-tert-butyl-6-(2-hydroxy-3-tert-butyl-5-methyl-benzyl)-4-methyl-phenol and 2-tert-butyl-6-[(3-tert-butyl-5-ethyl-2-hydroxyphenyl)methyl]-4-ethylphenol, the trifunctional 1,3,5-trimethyl-2,4,6-tris (3,5-Di-tert-butyl-4-hydroxybenzyl) benzene, 1,1,3-tris (2-methyl-4-hydrox-5-tert-butyl phenyl) butane, pentaerythritol tetrakis(3-(3,5-di-tert-butyl-4-hydroxyphenyl) propionate), and combinations thereof.

8. The polymer composition according to claim 1, wherein the pendant phenol antioxidant moiety and the mono-or oligo-functional phenol antioxidant have matching hindered phenol structural element.

9. The polymer composition according to claim 1 wherein the polymer composition is a film capacitor comprising a dielectric.

10. The polymer composition according to claim 1 wherein the polymer composition is an electric power system component comprising an insulator.

11. The polymer composition according to claim 1, wherein the polymeric antioxidant is a polypropylene-hindered phenol copolymer.

12. The polymer composition according to claim 1, wherein the polymer matrix comprises polypropylene, wherein the polymeric antioxidant comprises a PolyPropylene-Hindered Phenol copolymer.

13. The polymer composition of claim 1, further comprising from 2 weight % to 50 weight % of the polymeric antioxidant.

14. The polymer composition of claim 1, the polypropylene-hindered phenol copolymer having a structure represented by the following formula (I):

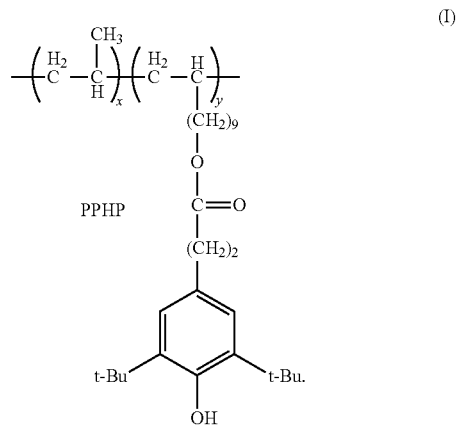

* * * * *